US006609930B2

(12) United States Patent
Epe et al.

(10) Patent No.: US 6,609,930 B2
(45) Date of Patent: Aug. 26, 2003

(54) ELECTRIC CONNECTOR

(75) Inventors: Peter Epe, Lennestadt (DE); Gerhard Birkenmaier, Meckenbeuren (DE); Wolfgang Schmid, Langenargen (DE); Hans-Joachim Martin, Kressborn (DE)

(73) Assignees: Leopold Kostal GmbH & Co. KG, Ludenscheid (DE); ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/169,642

(22) PCT Filed: Dec. 20, 2000

(86) PCT No.: PCT/EP00/13055

§ 371 (c)(1), (2), (4) Date: Sep. 4, 2002

(87) PCT Pub. No.: WO01/52363

PCT Pub. Date: Jul. 19, 2001

(65) Prior Publication Data

US 2003/0049960 A1 Mar. 13, 2003

(30) Foreign Application Priority Data

Jan. 7, 2000 (DE) .......................................... 200 00 16

(51) Int. Cl.$^{7}$ ................................................ H02B 1/01
(52) U.S. Cl. ....................................... 439/550; 439/565
(58) Field of Search ................................ 439/550, 565, 439/544

(56) References Cited

U.S. PATENT DOCUMENTS 2,869,094 A * 1/1959 Francis ....................... 439/354
5,066,247 A 11/1991 Watson
5,607,324 A * 3/1997 Saur et al. .................. 439/565
5,941,730 A * 8/1999 Uchiyama et al. .......... 439/559
6,394,814 B2 * 5/2002 Schmid et al. .............. 439/550

FOREIGN PATENT DOCUMENTS

| | | |
|---|---|---|
| DE | G 87 01 843.8 | 2/1987 |
| DE | 297 21 908 U1 | 12/1997 |
| DE | 298 08 527 U1 | 5/1998 |
| DE | 198 30 672 A1 | 7/1998 |
| DE | 0 923 172 A2 | 11/1998 |
| DE | 199 03 712 A1 | 1/1999 |

* cited by examiner

*Primary Examiner*—Hung V. Ngo
(74) *Attorney, Agent, or Firm*—Brooks & Kushman P.C.

(57) ABSTRACT

A plug-and-socket connection part for being fastened to a wall includes a contact housing, a guide sleeve extendable through a wall opening, a carrier, and a locking member. The locking member locks the guide sleeve, the contact housing, and the carrier together such that the guide sleeve and the carrier are connected to the contact housing in an axial direction free of play. The guide sleeve and the carrier each include a respective locking stop and the contact housing includes a flange. The locking member includes inner locking sections which are operable with the locking stop of the guide sleeve and the flange to prestress a support arrangement between the guide sleeve and the contact housing. The locking member includes outer locking sections which are operable with the locking stop of the carrier and the flange to prestress a support arrangement between the carrier and the contact housing.

11 Claims, 3 Drawing Sheets

ELECTRIC CONNECTOR

FIELD OF THE INVENTION

The invention relates to the area of electrical plug-and-socket connectors to achieve an electrical connection between two electrical areas that are separated from one another by a separating wall. In particular, the invention concerns an electrical plug-and-socket connection part which comprises a contact element housing with electrical contact elements for making contact with contact elements that are contained in a second plug-and-socket connection part that cooperates with the first plug-and-socket connection part and which comprises a guide sleeve that is held by the contact element housing and that is designed for reaching through an assembly opening in a wall and that engages in the guide sleeve opening of the contact element housing and is locked in the guide sleeve opening by a locking bar member, with this plug-and-socket connection part being fastened to the wall after it is assembled.

BACKGROUND ART

Such electrical plug-and-socket connection parts are required, for example, when transmission control systems are used in motor vehicles. In such a case, the transmission wall is the separating wall between an electrical plate, which is located within the transmission housing and which has a plug part that has electrical plug contacts and a pin housing arranged on it to make electrical contact, and the connection side. To make contact with the electrical plug contacts of the plug part, there is a receptacle part which can be pushed onto the electrical plug contacts to make the desired electrical plug-and-socket connection with the female insert contacts contained in the receptacle part. The receptacle part is arranged on one end of a cable harness whose other end is connected to the inputs and outputs of control electronics for monitoring and control of the electronics contained in the transmission housing.

Such a plug-and-socket connector is known from German utility model 297 21 908.1. In the electrical plug-and-socket connector described in this document, one plug-and-socket connection part—the plug part—is part of the electrical plate, from which the electrical plug contacts project toward the transmission wall. The plug contact arrangement is bordered by a fin-like holder edge. This holder edge forms both a holder for the front section of the receptacle part and one to hold a guide sleeve. The guide sleeve is arranged projecting from this holder upward through the transmission wall, and on the inside it borders the holder edge. The guide sleeve is connected with the holder edge by a clip bracket that is elastic in the radial direction and that acts like a locking bar. However, the guide sleeve is arranged in the guide sleeve opening so that it is not free of play in the axial direction. A section of the guide sleeve which has locking grooves on the outside projects out of the transmission wall on the side opposite the electrical plate. The locking grooves serve to lock a bayonet ring assigned to the receptacle part to secure the electrical plug-and-socket connection that has been made.

The bayonet ring has, on its plug-in side end, a support flange which is supported on the outer surface of the housing wall. The bayonet lock is designed in such a way that when the bayonet ring is set on it, that is when it is twisted to lock it, the guide sleeve is pulled out of the transmission wall to a certain extent. The transmission wall has elements arranged on it which act similar to grooved drive studs and which point toward the electrical plate and which engage into corresponding centering and attachment sleeves assigned to the electrical plate. When the bayonet ring is locked to the guide sleeve and when, as a result, the guide sleeve is pulled out, that is the electrical plate is pulled closer to the transmission wall, the elements acting similar to grooved drive studs are pressed into the centering and attachment sleeves that are assigned to them. After the bayonet ring is put on, the plug-and-socket connection part is attached to the transmission wall by the electrical plate associated with it.

To ensure that such a transmission operates perfectly for many years, it is necessary to arrange the electrical plug-and-socket connection part on the transmission wall so that it is free of play. If it is not attached so that it is free of play, transmission vibrations can damage the elements that can move against one another. Even if, with the previously known plug-and-socket connector, the electrical plate or the electrical plug-and-socket connector can be attached to the transmission wall so that it is free of play, the reliability of the attachment when there are transmission vibrations depends decisively on the quality of the frictional engagement between the lateral surface of the elements acting similar to grooved drive studs and the cylindrical inside surfaces of the centering and attachment sleeves. To produce a connection that withstands high extraction forces, it is necessary for the elements acting similar to grooved drive studs and the centering and attachment sleeves to be dimensioned in such a way, since the first have to be pressed with great force into the latter. As the number of attachment points used increases—normally there are about three—the force necessary to produce the connection also increases. Then manual assembly is not always possible. In addition, manufacturing tolerances in the arrangement of the centering and attachment sleeves and the elements acting similar to grooved drive studs can mean that the electrical plate is under undesired tension after the transmission wall is put on.

SUMMARY OF THE INVENTION

Therefore, starting from this prior art that has been discussed, the invention is based on the task of proposing an electrical plug-and-socket connection part of the type mentioned at the beginning which not only makes it possible for the individual elements to be fastened to one another so that they are free of play in the decisive direction, but which also simplifies its assembly.

This task is solved according to the invention by the fact that the guide sleeve is arranged so that it is supported in the axial direction in the guide sleeve opening of the contact element housing and has, at a distance from this support arrangement, a locking stop which acts against the direction of action of the support arrangement and which has lying against it a locking bar member that is elastic in the axial direction of the guide sleeve and that is supported on a stop of the contact element housing serving as a buttress to prestress the support arrangement of the guide sleeve, that the plug-and-socket connection part has assigned to it a carrier that is fixed to the wall and that is arranged so that it is supported on the contact element housing in the direction of action of the support arrangement between the guide sleeve and the contact element housing and has a locking stop which acts against the direction of action of this support arrangement and which has lying against it a locking bar member that is elastic in the axial direction of the guide sleeve and that is supported on a stop of the contact element housing acting as a buttress to prestress the support arrangement of the carrier, and that the locking bar members are held so that they can move in a guide as part of the contact element housing or the carrier.

In contrast to the previously known prior art, the guide sleeve is not only introduced into the opening assigned to the contact element housing, but rather is supported like a stop in the axial direction in the opening. At a distance to this support arrangement, the guide sleeve has a lock stop assigned to it, whose effective surface is arranged so that it points in the direction opposite the effective surface for implementing the support arrangement between the guide sleeve and the guide sleeve opening. The locking stop has the locking bar member lying against it, which is elastic in the axial direction. In order to apply a prestress to the guide sleeve in the direction of the support arrangement so that the guide sleeve is locked in the guide sleeve opening free of play, a stop assigned to the contact element housing acts as a buttress to the locking bar member. The locking bar member is held in a guide which is borne by the contact element and in which it can be put in its locking position, for example by sliding it. To fix the contact element housing to the wall, for example the inside of the transmission wall, which has an assembly opening arranged in it so that the guide sleeve can be passed through, the plug-and-socket connection part has a carrier assigned to it which is fastened to the wall, for example, by a threaded joint and which is connected so that it is free of play in the axial direction, in a manner corresponding to how the guide sleeve is connected with the contact element housing. After the two locking bar members are activated the guide sleeve is locked in the guide sleeve opening so that it is free of play in the axial direction, and the carrier is fixed to the contact element housing so that it is free of play in the axial direction.

With the plug-and-socket connection part according to the invention, the carrier is fixed with the contact element housing on the inside of a transmission housing, for example, before the guide sleeve is passed through the assembly opening from the other side and inserted into the guide sleeve opening of the contact element housing. If the front end section of the guide sleeve is inserted into the guide sleeve opening, the locking bar members can be activated to fix the individual elements—guide sleeve, contact element housing, carrier—to one another so that they are free of play in the axial direction and are effectively locked, at least relative to the guide sleeve. The locking bars can be activated in a simple manner, for example by sliding in a forked locking bar member whose arms can slide tangential to the guide sleeve or to the carrier. It should be taken into consideration that the inserted locking bar members are held in a guide borne by the contact element housing, preferably in a captive manner. Before assembly, a single module is located inside the wall, so that no other additional elements have to be passed to the inside of the wall to bring about the locking.

The two locking bar members can be arranged at an axial distance from one another. However, an expedient embodiment provides that the two locking bar members form a physical unit and that the two arms form a forked locking bar member. To make the two locking bar arms elastic, they have a bulge and consist of an elastic material, for example, spring steel. In such an embodiment, the stops of the contact element housing serving as buttresses are located in one plane, just like the locking stop of the guide sleeve or that of the carrier. This makes it possible for the two inside sections of the locking bar arms to lock the guide sleeve with the contact element housing and for the two outer sections of the locking bar arms to lock the contact element housing with the carrier. In this embodiment there is a simultaneous locking of the guide sleeve with the contact element housing and of the contact element housing with the carrier.

The carrier can represent a surrounding housing for the contact element housing.

The guide of a locking bar member can have arranged in it means of blocking which engage to prevent activation of a locking bar member without the guide sleeve being inserted into the guide sleeve opening. The blocking action of the means of blocking is eliminated by inserting the guide sleeve in the proper way. If a locking bar member is made in the form of a leaf spring with an elastic bulge, the activation of the locking bar can be blocked by a stop peg, for example. In such an embodiment the guide sleeve has an unlocking member assigned to it, by which the locking bar member is raised against its material elasticity so that it can be freely activated, so that the blocking action of the peg is eliminated.

BRIEF DESCRIPTION OF THE DRAWINGS

Further embodiments and advantageous further developments are a component of other subordinate claims as well as the following description of a sample embodiment, which makes reference to the attached figures. The figures are as follows:

DETAILED DESCRIPTION

Figures 1, 2:
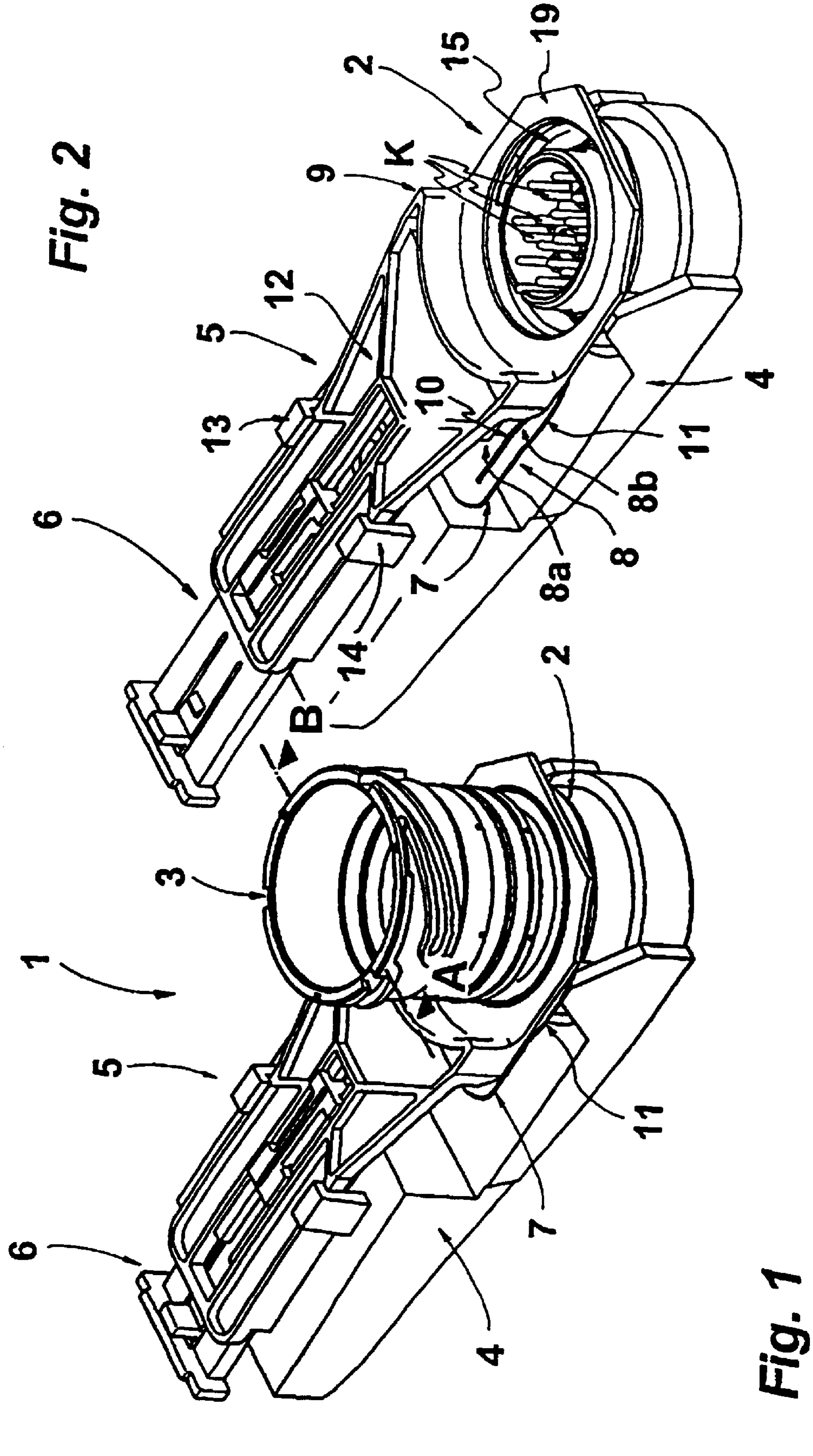
FIG. 1: A three-dimensional view of a plug-and-socket connection part consisting of a guide sleeve, a contact element housing, and a carrier.
FIG. 2: The arrangement in FIG. 1 without the guide sleeve.

An electrical plug-and-socket connection part 1 is part of an electrical plug-and-socket connector to make contact with the electrical/electronic components located within a motor vehicle transmission. Electrical plug-and-socket connection part 1 consists essentially of a contact element housing 2, which has arranged in it—as can be seen from FIG. 2—a number of contact pins K, a guide sleeve 3, a carrier 4, and a locking device 5. Locking device 5 is used to lock guide sleeve 3 with contact element housing 2 so that it is free of play in the axial direction as well as to fix carrier 4 on contact element housing 2 so that it is free of play relative to the axial extent of guide sleeve 3. Carrier 4 is made as a surrounding housing for contact element housing 2 and is fastened to the inside wall of the transmission housing.

In the sample embodiment shown, locking device 5 is implemented by a slide 6, which has a locking bar member 7 arranged on one end of it. Locking bar member 7 is forked to form two locking arms 8, 9 which enclose a U-shaped recess and grasp around guide sleeve 3. Each locking bar arm 8, 9 is subdivided into two sections **8*a*, 8*b* and 9*a*, 9*b*, respectively, which are separated from each other by a slit 10. Locking bar arms 8, 9 have an elastic bulge 11, which applies the necessary prestress to the elements of plug-and-socket connection part 1** that need to be locked.

Locking bar sections **8*a*, 8*b* and 9*a*, 9*b*, respectively are connected with one another at the two ends of the respective locking bar arm 8, 9. Slit 10, which extends at least over the area of bulge 11 of each locking bar arm 8, 9, makes it possible for the individual locking bar sections 8***a*, 8*b* and 9*a*, 9*b*, respectively to be loaded independently of one another.

Slide 6 with its locking bar member 7 is mounted in a guide 12 made on contact element housing 2 so that it can slide radially to the longitudinal axis of guide sleeve 3. To stabilize the guide 12 projecting from contact element housing 2, the guide 12 is additionally held by stays 13, 14 on carrier 4.

Figure 3:
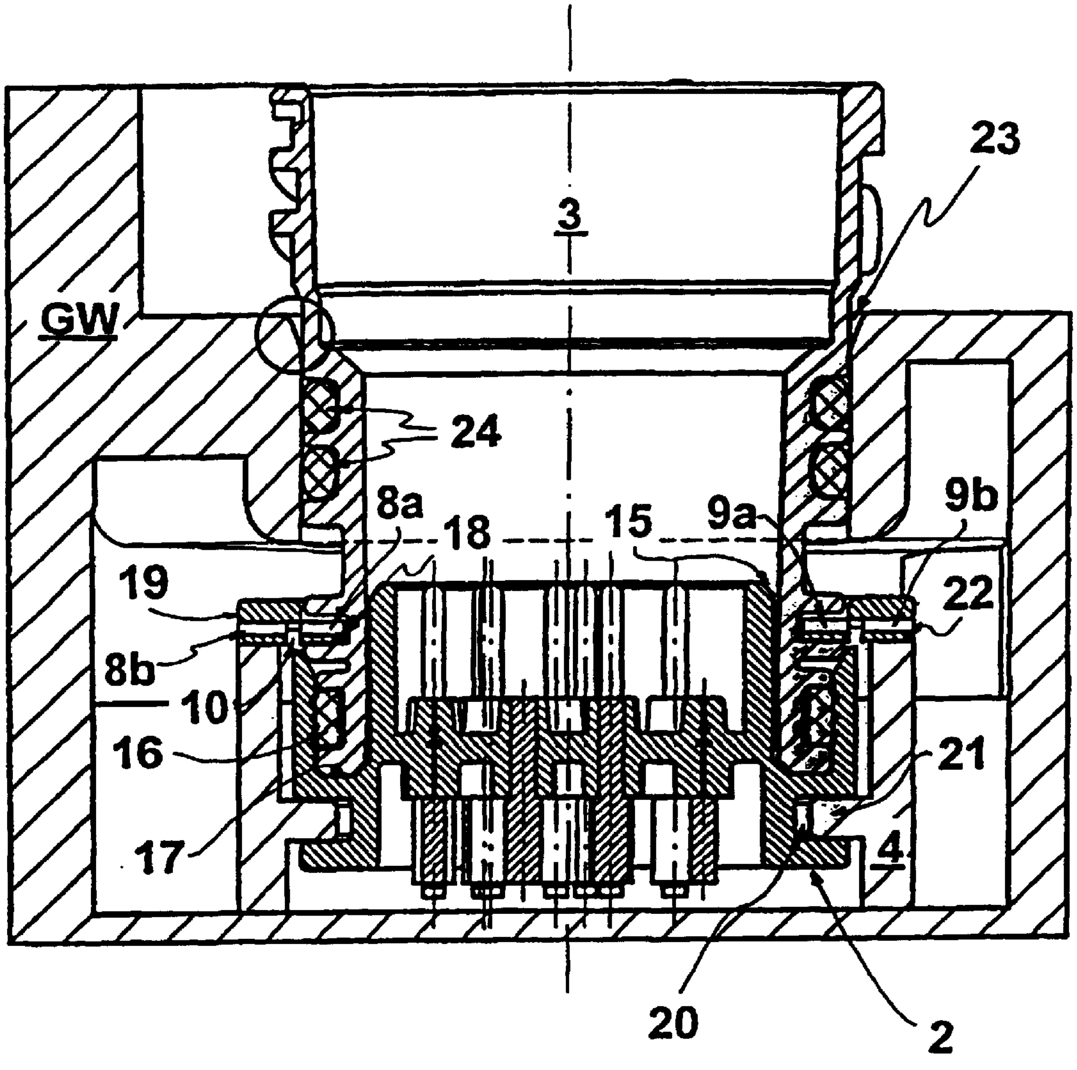
FIG. 3: A cross section through the plug-and-socket connection part in FIG. 1 along line A-B, whose guide sleeve passes through a transmission wall.

Contact element housing 2 comprises a guide sleeve opening 15, into which the front section of guide sleeve 3 is inserted, as can be seen from the cross section in FIG. 3. Guide sleeve opening 15 is made as an annular groove that is concentric to the contact pin arrangement. On the outside, guide sleeve 3 is sealed to the outer wall of guide sleeve opening 15 by a sealing ring 16.

The front face 17 of guide sleeve 3 is supported on the floor of guide sleeve opening 15. To lock guide sleeve 3 in guide sleeve opening 15 so that it is free of play, guide sleeve 3 has a locking stop 18 whose effective surface is arranged so that it points away from the front face 17. In the sample embodiment shown locking stop 18 is made as a ring-shaped groove. In the locking position of locking bar member 7, whose two locking bar member sections 8*a*, 8*b* and 9*a*, 9*b* that are separated by slit 10 can be seen in FIG. 3, the two inside locking arm sections 8*a*, 9*a* engage into the groove of the guide sleeve 3 which forms locking stop 18, so that bulge 11 rests against locking stop 18. As a buttress to apply the desired prestress to guide sleeve 3, the two inside locking arm sections 8*a*, 9*a* are supported on a flange 19 which is made on contact element housing 2 and which serves as a buttress (see also FIG. 4). Here the clearance between the bottom of flange 19 and the locking stop 18 is dimensioned so that in unstressed state it is smaller than the height of the bulge. In locked position guide sleeve 3 is connected with contact element housing 2 so that it is free of play in the axial direction.

In a corresponding manner carrier 4, which is made as a surrounding housing with respect to contact element housing 2, is also connected with contact element housing 4. To provide support, contact element housing 2 has a bottom peripheral groove 20, into which a support flange 21 of carrier 4 is arranged so that it engages. With carrier 4, a locking stop 22 is provided by its top edge, which is located in one plane with the locking stop 18 of guide sleeve 3. Carrier 4 is fixed on contact element housing 2 so that it is free of play relative to fixing in the axial direction by the two outer locking arm sections 8*b* and 9*b*. The bulges of these locking arm sections 8*b*, 9*b* are supported on the top side of carrier 4, which serves as locking stop 22. A buttress for this support is provided in turn by flange 19 of contact element housing 2. The two-part design of each locking arm 8, 9 allows different tolerances between the contact element housing 2 and guide sleeve 3, on the one hand, and between contact element housing 2 and carrier 4, on the other hand to be individually compensated.

The summary of the locking bar members that are necessary in the presented sample embodiment to produce the two locks in a physical unit has the advantage that the three components can be locked with one another by a single locking movement.

The cross section shown in FIG. 3 additionally shows a transmission wall GW, which has an assembly opening 23 in it for the guide sleeve to pass through. Guide sleeve 3 is sealed off to the inside of assembly opening 23 by two sealing rings 24.

Figure 4:
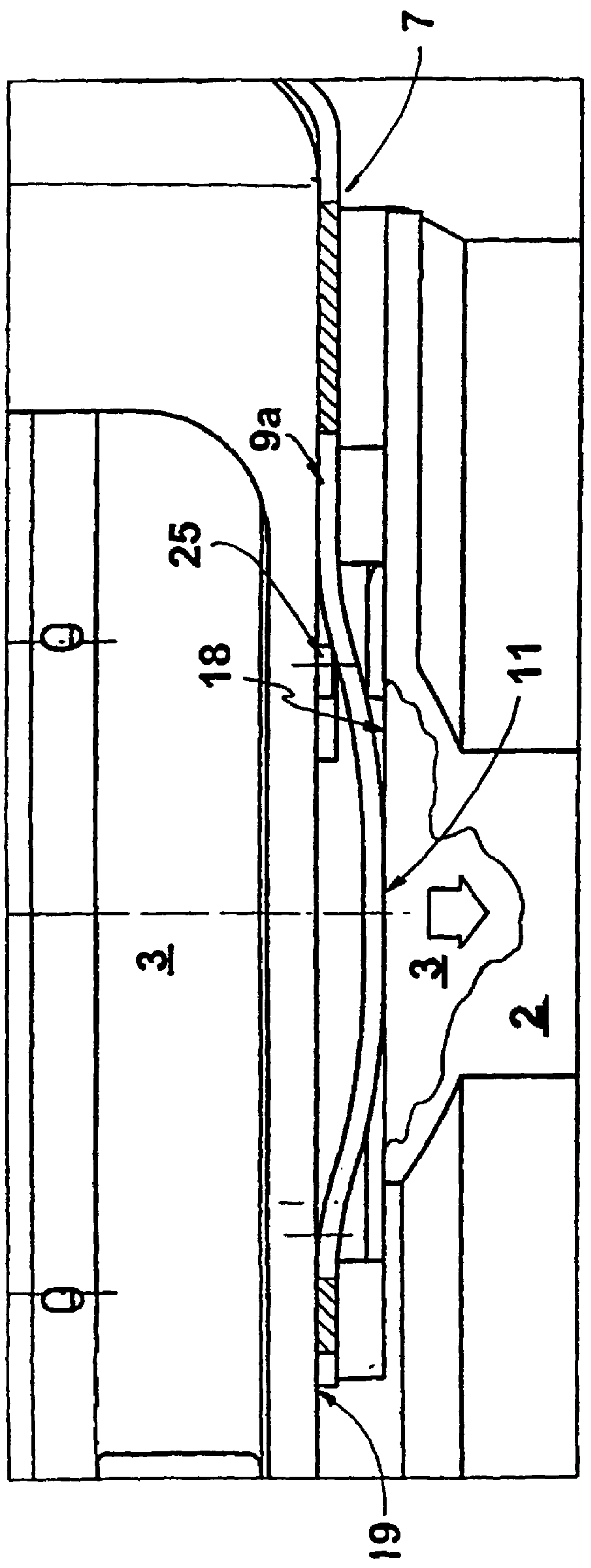
FIG. 4: An enlarged side view of FIG. 1, however without carrier 4 showing the locking between the contact element housing and the guide sleeve.

An enlarged section of the locking arrangement between contact element housing 2 and guide sleeve 3 is shown in FIG. 4 in the form of a side view. Locking bar member 7, of which locking arm section 9*a* is shown, is in locked position. Locking bar arm 9 and thus also locking bar arm section 9*a* pass in a tangential groove of contact element housing 2. This groove represents a break-through into guide sleeve opening 15, so that locking arm section 9*a* can be engaged with the locking stop 18 of guide sleeve 3. To illustrate this support contact element housing 2 is shown opened up in the area of bulge 11 in FIG. [4]. The bottom side of the elastic bulge 11 of locking bar arm section 9*a* presses against locking stop 18 of guide sleeve 3. The two other sections of locking bar arm section 9*a* press against the bottom of support flange 19 of contact element housing 2, so that this arrangement causes a force to act on guide sleeve 3 in the direction of the support arrangement formed in guide sleeve opening 15 (see arrow in FIG. 4). In this way, guide sleeve 3 is connected with contact element housing 2 so that it is free of play in its axial direction.

Projecting downward from the plane of support flange 19 there is a blocking pin 25, against which lies the front end of locking bar arm 9, that is locking bar arm section 9*a*, if guide sleeve 3 is not inserted into guide sleeve opening 15. This prevents locking bar member 7 being in locked position before guide sleeve 3 is inserted into guide sleeve opening 15 of contact element housing 2. Instead of the blocking pin 25 shown in FIG. 4 it is also possible to provide a bulge or something similar. To release locking bar arm 9, that is locking bar arm section 9*a*, the guide sleeve carries a driver, which causes the insertion movement of guide sleeve 3 to move the front section of locking bar arm section 9*a* away from resting against support flange 19, so that it is then possible for locking bar arm 9, that is locking bar arm section 9*a*, to be activated for proper locking of guide sleeve 3.

LIST OF REFERENCE NUMBERS

1 Electrical Plug-and-Socket Connection Part
2 Contact element housing
3 Guide sleeve
4 Carrier
5 Locking device
6 Slide
7 Locking bar member
8 Locking bar arm
8*a*, 8*b* Locking bar arm section
9 Locking bar arm
9*a*, 9*b* Locking bar arm section
10 Slit
11 Bulge
12 Guide
13 Stay
14 Stay
15 Guide sleeve opening
16 Sealing ring
17 Front face
18 Locking stop
19 Flange
20 Groove
21 Support flange
22 Locking stop
23 Assembly opening
24 Sealing ring
25 Blocking pin
GW Transmission wall
K Contact pins

What is claimed is:

1. An electrical plug-and-socket connection part operable for being fastened to a wall after assembly, the part comprising:

a contact element housing having electrical contact elements for contacting electrical contact elements of another plug-and-socket connection part, the contact element housing having a guide sleeve opening which terminates in a support arrangement, the contact element housing having a flange around the periphery of the guide sleeve opening at a distance from the support arrangement;

a guide sleeve operable for reaching through an opening of a wall to be inserted in the guide sleeve opening of the contact element housing and engage the support arrangement of the guide sleeve opening in order to be held by the contact element housing such that the guide sleeve is supported in an axial direction in the guide sleeve opening of the contact element housing, wherein the guide sleeve includes a locking stop at a distance from the support arrangement, the locking stop acts against the direction of action of the support arrangement;

a carrier fixed to the wall and arranged to be supported on the contact element housing in the direction of action of the support arrangement, the carrier having a locking stop which acts against the direction of action of the support arrangement; and a locking bar member operable to move in a guide for locking the guide sleeve in the guide sleeve opening of the contact element housing and for locking the contact element housing with the carrier, the locking bar member including a pair of inner and outer locking bar sections which are elastic in the axial direction of the guide sleeve, wherein the inner locking bar sections lie against the locking stop of the guide sleeve and are supported on the flange of the contact element housing which acts as a buttress to prestress the support arrangement of the guide sleeve, wherein the outer locking bar sections lie against the locking stop of the carrier and are supported on the flange of the contact element housing which acts as a buttress to prestress the support arrangement of the carrier.

2. The part of claim 1 wherein:

the contact element housing includes the guide.

3. The part of claim 1, wherein:

the carrier includes the guide.

4. The part of claim 1 wherein:

the locking bar member is forked to form two locking bar arms having the inner and outer locking bar sections, the inner and outer locking bar sections each having an elastically deformable bulge whose one side is supported against the respective locking stops and whose other side is supported on the flange.

5. The part of claim 4 wherein:

the inner and outer locking bar sections are separated from one another by a slit extending at least along the elastically deformable bulge.

6. The part of claim 1 wherein:

the locking bar member is operable to move such that the inner and outer locking bar sections slide tangential to the contact element housing.

7. The part of claim 1 wherein:

the flange of the contact element housing is arranged in the same plane around the periphery of the guide sleeve opening.

8. The part of claim 7 wherein:

the locking stop of the guide sleeve and the locking stop of the carrier are arranged in one plane.

9. The part of claim 8 wherein:

the inner and outer locking bar sections are arranged parallel to one another in one plane.

10. The part of claim 1 wherein:

the carrier is a surrounding housing enclosing the contact element housing.

11. The part of claim 1 wherein:

the guide of the locking bar member has blocking means to prevent locking bar activation without a guide sleeve being inserted in the guide sleeve opening and the guide sleeve has unlocking means to eliminate the blocking action when the guide sleeve is inserted into the guide sleeve opening of the contact element housing.

* * * * *